UNITED STATES PATENT OFFICE.

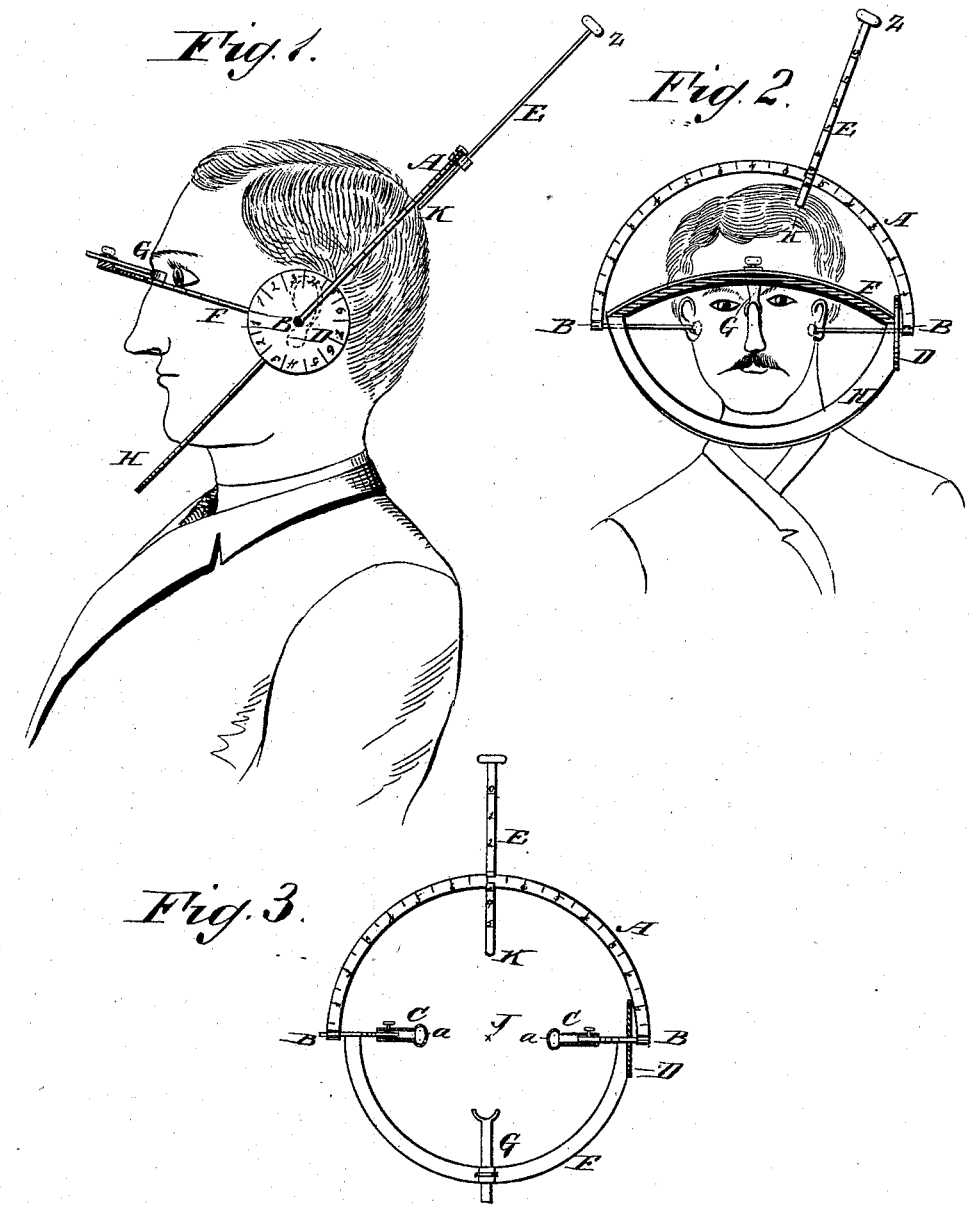

CLARK BROWN, OF HARBOR, NEW YORK.

CEPHALOMETER.

SPECIFICATION forming part of Letters Patent No. 268,614, dated December 5, 1882.

Application filed April 5, 1882. (No model.)

*To all whom it may concern:*

Be it known that I, CLARK BROWN, of Harbor, Herkimer county, New York, have invented a new and Improved Cephalometer, of which the following is a full, clear, and exact description.

The invention consists of an improved instrument for taking measurements of the human head for phrenology, ethnology, anthropology, and sculpture, the said instrument consisting of the combination and arrangement of parts, substantially as hereinafter more fully set forth, whereby the actual measurements may be accurately taken of all portions of the head with relation to the central point of the head corresponding with the head of the spinal column, (medulla oblongata,) all as hereinafter described.

Reference is to be had to the accompanying drawings, forming part of this specification, in which similar letters of reference indicate corresponding parts in all the figures.

Figure 1 is a side view of the figure of a human head with the instrument applied to it. Fig. 2 is a front elevation of Fig. 1, and Fig. 3 is a plan view of the instrument with the pivots sectioned.

A represents a graduated semicircular arc, fixed at its ends on axial pivots B, having hollow bulbous extensible sections C, adapted to enter the openings of the ears, and one of said pivots having a graduated scale, D, by which to register the traverse of the arc on said pivots. The bulbs C have perforations *a*, to admit sound to the ears.

E is a scale traversing the arc A radially, and also sliding along it from end to end.

F is an arched stay-brace, connecting the pivots and passing over the front of the figure, so as to adjust the steady-rest G on the nose. H is another arched brace connecting the pivots. It passes under the chin.

It will be seen that pivots B and scale E radiate from J, which represents the central point of the head from which the measurements are to be taken. The zero-point (0) on the scale E is that which coincides with the arc A when the end K of said scale stands at center J.

It will readily be seen that by the traverse of the arc A forward and backward on points B, and the traverse of scale E along and radially to arc A, the relative positions of the different organs or other divisions of the head, and also the relative sizes or distances from axis J, can be readily and accurately taken.

Phrenologists ascribe different mental faculties to special organs or divisions of the brain, and judge of the power of a faculty by the development or size of its organ, which they determine by estimating the distance of that part of the skull where it lies from the medulla oblongata, which is situated very nearly on a line between the openings of the ears and midway between them. To thus estimate skillfully requires considerable practice and special adaptation. The instrument that I have contrived, as herein described, makes these estimates actual measurements, giving the absolute size of each part or organ— that is, the distance of its outside surface from the medulla oblongata—hence, also, giving the relative size.

I propose to designate the said improved instrument, as expressed in the title, the "cephalometer."

Having thus described my invention, I claim as new, and desire to secure by Letters Patent—

1. The combination of the graduated semicircular arc A, scale E, and pivots B, said pivots having hollow bulbous extensible sections C, substantially as specified.

2. The combination of the semicircular graduated arc A, scale E, and pivots B, said pivots having hollow perforated bulbous sections C, substantially as specified.

CLARK BROWN.

Witnesses:
THOS. W. SPENCER,
J. D. SHULTZ.